Aug. 9, 1938.  S. R. OGILBY  2,126,275
METHOD OF MAKING SPONGE RUBBER
Filed July 10, 1936

STABILIZED LATEX CONTAINING A CARBONATE

↓ RELEASE OF CARBON DIOXIDE

UNCOAGULATED LATEX FOAM

↓ POUR INTO MOLDS

SHAPED UNCOAGULATED LATEX FOAM

↓ COAGULATE

SHAPED RUBBER SPONGE

INVENTOR.
STEWART R. OGILBY
BY *Gourley & Budlong*
ATTORNEYS

Patented Aug. 9, 1938

2,126,275

UNITED STATES PATENT OFFICE 2,126,275

METHOD OF MAKING SPONGE RUBBER

Stewart R. Ogilby, Staten Island, N. Y., assignor to United States Rubber Products, Inc., New York, N. Y., a corporation of Delaware Application July 10, 1936, Serial No. 90,007

8 Claims. (Cl. 18—53)

This invention relates to methods of making sponge rubber, and more particularly to methods of making sponge rubber from latex by liberation of a gas in the latex.

The invention constitutes an improvement upon the method set out in U. S. Patent No. 1,156,184 to Schidrowitz and Goldsbrough. In this prior patent, carbon dioxide is liberated from a carbonate in a latex composition in a mold of the desired shape to form a spongy coagulum which is vulcanized and dried to produce a rubber sponge. According to the present invention the carbon dioxide is liberated from a carbonate in the latex compound under such conditions that a substantially uncoagulated foam is formed which is then converted into the desired shape as by pouring into molds and coagulated to form the rubber sponge. Such a process provides greater ease and flexibility of operation since the blowing of any desired amount of the latex compound may take place in a storage or mixing device and the foam then poured into the desired number of molds for coagulation therein. In this manner, a greater uniformity of product is obtained and the handling of materials is facilitated by eliminating the necessity for a multiplicity of separate blowing operations in the individual molds as in the process of the prior patent.

There are various methods of carrying out the present invention and these are illustrated in the following examples which are intended to show various types of reactions for liberating the carbon dioxide in the latex and different methods for maintaining the foam in a substantially uncoagulated condition until the shaping operation, after which the coagulation is made to take place.

Example 1

In this example, an acid latex containing an excess of acid is mixed with an alkaline latex containing sodium bicarbonate (compositions below) in the presence of sufficient saponin to stabilize the latex in the resulting foam against coagulation by acid at the temperature of the reaction but not at elevated temperatures. The foam is then introduced into molds and the molded foam is then heated to coagulate the latex therein to produce rubber sponge.

Acid latex containing excess acid

| | Parts by weight |
|---|---|
| Latex (once creamed): | |
|   Solids | 100. |
|   NH$_3$ | .72 |
|   Water | 52.28 |
| 10% saponin aq. solution | 10 |
|   Water | 15 |
| 99% acetic acid | 10.75 |
|   Water | 159.10 |
| Paste: | |
|   Mercaptobenzothiazole (accelerator) | 2.00 |
|   Potassium caseinate | .02 |
|   Gum arabic | .08 |
|   Potassium oleate | .10 |
|   Water | 2.20 |

In compounding the above acid latex, the acid and latex are cooled to about 5° C. and the acid poured rapidly into the latex with stirring after which the accelerator paste is added to the mixture.

Alkaline latex containing blowing agent

| | Parts by weight |
|---|---|
| Latex (once creamed): | |
|   Solids | 100. |
|   NH$_3$ | .72 |
|   Water | 52.28 |
| 10% saponin aq. solution | 5 |
| 61.6% sulfur aq. suspension | 6.50 |
| Suspension: | |
|   NaHCO$_3$ | 15.10 |
|   Water | 65 |
| Paste: | |
|   Zinc oxide | 5 |
|   Glue | .20 |
|   Water | 7.50 |
| Solution: | |
|   Casein | 2 |
|   28% NH$_3$ aq. solution | .24 |
|   Water | 17.76 |

The compounding ingredients are added to the latex in the above order, no particular precautions being necessary.

The alkaline latex containing the sodium bicarbonate is added to the acid latex with gentle stirring to insure proper mixing of the latices. A foam is produced which can be readily poured into a mold. Although some thickening may take place, the foam here, as in the other examples, is considered to be substantially uncoagulated so long as it is capable of being poured into the desired molds. The foam is poured into open or closed molds which are placed in a steam vulcanizer at 4 pounds saturated steam for one hour to set or coagulate the foam; the steam pressure is then increased to 30 pounds for one hour to complete the cure. The foam in the mold is coagulated at the initial temperature of the vulcanizer due to the failure of the saponin to continue to stabilize the latex in the foam against coagulation by acid at elevated temperatures, and the rubber sponge thus formed is cured. The wet sponge may then be centrifuged to eliminate a large proportion of the contained water, and dried.

Example 2

In this example, an acid is mixed with latex (composition below) containing ammonium bicarbonate in the presence of a stabilizer of latex against coagulation by acid, and a heat sensitizing agent. The foam produced by the reaction is introduced into molds and the molded foam is then heated to induce coagulation of the latex and produce rubber sponge.

*Latex containing blowing agent, stabilizer, and heat sensitizing agent*

| | Parts by weight |
|---|---|
| Latex (once centrifuged): | |
|   Solids | 100 |
|   $NH_3$ | .92 |
|   Water | 62 |
| Emulphor O (50% aq. solution) | 1 |
| Emulphor O (50% aq. solution) | 1 |
| Formaldehyde (37.6% aq. solution) | 5.1 |
| Paste: | |
|   Sulphur | 2 |
|   Zinc dibutyldithiocarbamate (accelerator) | .5 |
|   Dimethylamine caseinate | .06 |
|   Darvan (dispersing agent) | .12 |
|   Water | 2.6 |
| Paste: | |
|   Zinc oxide | 2 |
|   Darvan | .04 |
|   Water | 1.1 |
| Magnesium carbonate (dry) | 3 |
| Ammonium bicarbonate (dry) | 4 |

The various ingredients are mixed together in the order indicated by means of a high speed stirrer but without beating any appreciable amount of air into the latex. Emulphor O is used to stabilize the latex against coagulation by the acid. It is sold by the General Dyestuff Corporation and, according to them, is made by the interaction of ethylene oxide and a higher alcohol. The Darvan is a dispersing agent sold by the R. T. Vanderbilt Company and is believed to be a reaction product of formaldehyde and a naphthalene sulphonic acid. The magnesium carbonate is the heat sensitizing agent and produces a coagulation of the latex foam at elevated temperatures.

To cause the above compound to foam, there is added to each 184 grams of the latex compound 14 cc. of the following acid solution:

| | Parts by weight |
|---|---|
| Free acetic acid | 20 |
| Ammonium acetate | 11.0 |
| Emulphor O | 3.6 |
| Water | 65.4 |

The above solution is made by first mixing 60 parts of glacial acetic acid, 15 parts of a 50% Emulphor O aqueous solution, and 116.8 parts of water. To this mixture is then added 18.2 parts of a 28% ammonia solution which reacts with some of the acetic acid to form 11.0 parts of ammonium acetate per 100 of solution, the purpose of the ammonium acetate being to decrease the severity of the action of the acid on the latex.

The acid solution described above is added to the compounded latex with mild stirring not involving the introduction of any appreciable air into the latex and a latex foam that can be readily poured into molds is produced. The foam is poured into molds and heated in air or steam at about 260° F. for one to two hours after which the molds are removed from the oven and the sponges stripped from the same. The sponges are sufficiently cured so that they will hold their shape on removal from the molds. The sponges are now washed, excess water squeezed out of the pores and then dried and the cure continued in an air oven at about 170° F. for 24 hours to complete the vulcanization.

Example 3

In this example, formaldehyde is mixed with latex (composition below) containing ammonium bicarbonate in the presence of a stabilizer to prevent coagulation of the latex by formaldehyde and carbonic acid, and a heat sensitizing agent. The foam produced by the reaction is introduced into molds, and the molded foam is then heated to coagulate the latex and form sponge rubber.

*Latex containing blowing agent, stabilizer and heat sensitizing agent*

| | Parts by weight |
|---|---|
| Latex (once creamed): | |
|   Solids | 100 |
|   $NH_3$ | .7 |
|   Water | 55 |
| Emulphor O (50% aqueous solution) | 2 |
| Formaldehyde (37% aqueous solution to reduce $NH_3$ content to zero | 5.0 |
| Magnesium carbonate (dry) | 3 |
| Ammonium bicarbonate (dry) | 7 |
| Paste: | |
|   Zinc dibutyldithiocarbamate (accelerator) | .75 |
|   Sulphur | 2 |
|   Darvan | .12 |
|   Water | 4 |
| Paste: | |
|   Zinc oxide | 2 |
|   Darvan | .03 |
|   Water | 1 |

The various ingredients are mixed together in the order indicated. The temperature of the latex increases on addition of the formaldehyde and the ammonia and therefore the latex should be cooled to below 65° F. after addition of the formaldehyde and before proceeding with the rest of the compounding. The magnesium carbonate, like other well known bi- and tri-valent metal salts, acts as a heat sensitizing agent. The Emulphor O stabilizes the latex against coagulation by formaldehyde and carbonic acid until it is heated after the molding of the foam produced by interaction of the formaldehyde and ammonium bicarbonate.

Four parts of 37% aqueous formaldehyde solution per 100 parts of latex solids are added to the above latex composition with slow stirring, whereupon the formaldehyde reacts with the ammonium bicarbonate to form hexamethylenetetramine and carbonic acid which breaks up into water and carbon dioxide which is released and forms the foam. As soon as the evolution of gas is complete, the foam is poured into molds, and the molds placed in a steam heater where the temperature is raised to 260° F. during thirty minutes and held there for about an hour. The coagulated and partly cured sponges are then stripped from the molds, excess water removed, and dried and the cure finished in a hot air chamber at 180° F.

*Example 4*

In this example, formaldehyde is mixed with latex (composition below) containing an ammonium salt of an acid that is stronger than carbonic acid and potassium carbonate in the presence of a temporary stabilizer of latex against coagulation. The foam produced by the reaction is introduced into molds, and the molded foam is coagulated by rendering the stabilizer ineffective on standing or by heating.

*Latex containing blowing agent and temporary stabilizer*

| | Parts by weight |
|---|---|
| Latex (once creamed): | |
| Solids | 100 |
| NH₃ | .66 |
| Water | 53 |
| Potassium hydroxide (20% aq. solution) | 4.5 |
| Potassium hydroxide (20% aq. solution) | 1.65 |
| Formaldehyde (37.69% aq. solution) | 4.64 |
| Water | 15 |
| Sulphur (61.6% aq. suspension) | 4.06 |
| Paste: | |
| Mercaptobenzothiazole (accelerator) | 1 |
| Darvan (40% aq. solution) | .1 |
| Water | .8 |
| Paste: | |
| Zinc oxide | 5 |
| Darvan (40% aq. solution) | .2 |
| Water | 2.5 |
| Water | 25 |

The various ingredients are mixed together in the order indicated and to the thus compounded latex is added, also in the order indicated, the following:

| | |
|---|---|
| Potassium carbonate (20% aq. solution) | 20 |
| Formaldehyde (37.8% aq. solution) | 14.25 |
| Ammonium acetate (25% aq. solution) | 29.6 |
| Darvan (40% aq. solution) | 12.50 |

In this example, ammonium ions and carbonate ions are present from the solutions of potassium carbonate and ammonium acetate and the formaldehyde may react with the ammonium ions to form hexamethylene tetramine, and carbonic acid which liberates carbon dioxide. There is also a further reaction that may take place, namely, the liberation of acetic acid by the reaction of the formaldehyde upon the ammonium acetate, and the acetic acid in turn reacting with the potassium carbonate to liberate the carbon dioxide. In any case there is an evolution of carbon dioxide which inflates or "blows" the latex compound into a foam. The Darvan which in Examples 2 and 3 above acts as a dispersing agent acts in this example additionally as a temporary stabilizer against coagulation of the latex by the formaldehyde and carbon dioxide and any acetic acid which may be liberated. The Darvan, however, is only a temporary stabilizer, even at room temperature, and if the foam is permitted to stand it will slowly coagulate as the Darvan loses its effectiveness as a protective. The foam is therefore poured into molds before coagulation of the latex, and coagulation is then made to take place, by standing, or preferably is hastened by applying heat. To accomplish the coagulation the molds containing the foam are placed in a steam vulcanizer at 4 pounds saturated steam for one hour. The steam pressure is then increased to 30 pounds for one hour, and the resulting cured wet sponge is removed, excess water extracted by wringer rolls or by centrifugal force, and the sponge dried in warm air.

The above examples are set forth as illustrations, more or less in detail, of various types of reactions for producing a substantially uncoagulated latex foam which may be poured into molds and the latex in the foam after introduction into the molds coagulated to produce a sponge. In these examples, the carbon dioxide has been liberated from the carbonate by a reduction of the pH of the latex containing the carbonate; in Examples 1 and 2 by the direct addition of an acidic material, and in Examples 3 and 4 by the addition of formaldehyde to react with the ammonium carbonate or ammonium acetate to form hexamethylenetetramine and liberate carbonic acid or acetic acid. Many other types of reactions utilizing the principles of the above examples may be carried out. The carbonates employed as the blowing agents or source of carbon dioxide in the latex may be normal carbonates, basic carbonates, or acid carbonates or "bicarbonates", the use of bicarbonates being particularly advantageous because of the lesser quantity of reagent required to liberate the carbon dioxide therefrom. Furthermore the carbon dioxide may be liberated by heat from ammonium carbonate or ammonium bicarbonate, for example, instead of chemically as in the above examples. It has been found that ammonium bicarbonate begins to decompose at 43° C. and that blowing is essentially complete at 50° C. The latex compound containing ammonium bicarbonate can be readily adjusted with stabilizers so that it is stable against coagulation by carbonic acid below say 80° C. but will coagulate rather sharply above 80° C. In such a case, the compound may then be heated at temperatures between 50° C. and 80° C. until the ammonium bicarbonate has been decomposed and the foaming completed, the foam then poured into molds and the molds heated to above 80° C. to coagulate the latex in the molded foam to produce the rubber sponge. The drawing shows the essential steps of the applicant's process, namely, releasing carbon dioxide by one of the above exemplified methods (step illustrated at top arrow) from a "stabilized latex containing a carbonate" to form an "uncoagulated latex foam" which may be poured into molds (step illustrated at middle arrow) to give a "shaped uncoagulated latex foam" which is coagulated (step illustrated at bottom arrow) to form the "shaped rubber sponge" final product.

The different methods of stabilizing the latex foam until after molding exemplified above may be utilized with any of the various types of reactions for liberating the carbon dioxide described, as will be readily apparent. Various stabilizers against coagulation, such as the sodium salts of alkyl naphthylene sulphonic acids sold under the trade name of Nekal, and sulphated or sulphonated higher alcohols, such as lauryl and oleyl alcohol, sold under the trade names of Igepon and Gardinol, may be used. Various bi- and tri-valent metal salts may be used as the heat-sensitizers, as is well known in the compounding of heat sensitive latices.

The term "latex" in the description and claims is used to designate broadly coagulable dispersions of elastic materials, including artificial dispersions of rubber or rubber-like materials as well as natural latex, which may be preserved or compounded or otherwise treated as desired and which may be in a normal, diluted, concentrated or purified condition produced by methods well known in the art.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making sponge rubber which comprises liberating carbon dioxide from a carbonate in a fluid latex composition to form a substantially uncoagulated latex foam, converting the foam into the desired shape, and then coagulating the latex in the foam to form rubber sponge.

2. The method of making sponge rubber which comprises liberating carbon dioxide from a carbonate in a fluid latex composition to form a latex foam while preventing substantial gelling of the composition, converting the foam into the desired shape, and then heating the foam to coagulate the latex therein to form rubber sponge.

3. The method of making sponge rubber which comprises reducing the pH of a latex which is temporarily stabilized against coagulation on reduction of the pH and which contains a carbonate which liberates carbon dioxide on reduction of the pH thereby liberating carbon dioxide and forming a substantially uncoagulated latex foam, converting the foam into the desired shape, and then coagulating the latex in the foam to form rubber sponge.

4. The method of making sponge rubber which comprises reducing the pH of a latex which contains a carbonate which liberates carbon dioxide on reduction of the pH, a stabilizer against coagulation of the latex on reduction of the pH, and a heat-sensitizing agent, thereby forming a substantially uncoagulated latex foam, converting the foam into the desired shape, and then heating the foam to coagulate the latex therein to form rubber sponge.

5. The method of making sponge rubber which comprises adding an acidic material to a latex which is temporarily stabilized against substantial coagulation on addition of said acidic material, and which contains a carbonate, thereby forming an uncoagulated latex foam by liberation of carbon dioxide in the latex by reaction of the acidic material upon the carbonate, converting the foam into the desired shape, and then coagulating the latex in the foam to form rubber sponge.

6. The method of making sponge rubber which comprises adding an acidic material to a latex which is stabilized at room temperatures but not at elevated temperatures against substantial coagulation on addition of said acidic material, and which contains a carbonate, thereby forming an uncoagulated latex foam by liberation of carbon dioxide in the latex by reaction of the acidic material upon the carbonate, converting the foam into the desired shape, and then heating the foam to coagulate the latex therein to form rubber sponge.

7. The method of making sponge rubber which comprises adding formaldehyde to a latex which is temporarily stabilized against substantial coagulation on addition of said formaldehyde, and which contains an ammonium carbonate, thereby forming a substantially uncoagulated latex foam by liberation of carbon dioxide in the latex by reaction of the formaldehyde upon the ammonium carbonate, converting the foam into the desired shape, and then coagulating the latex in the foam to form rubber sponge.

8. The method of making sponge rubber which comprises adding formaldehyde to a latex which is temporarily stabilized against substantial coagulation on addition of said formaldehyde, and which contains ammonium ions and carbonate ions, thereby forming a substantially uncoagulated latex foam by liberation of carbon dioxide in the latex, converting the foam into the desired shape, and then coagulating the latex in the foam to form rubber sponge.

STEWART R. OGILBY.